Figure 1:
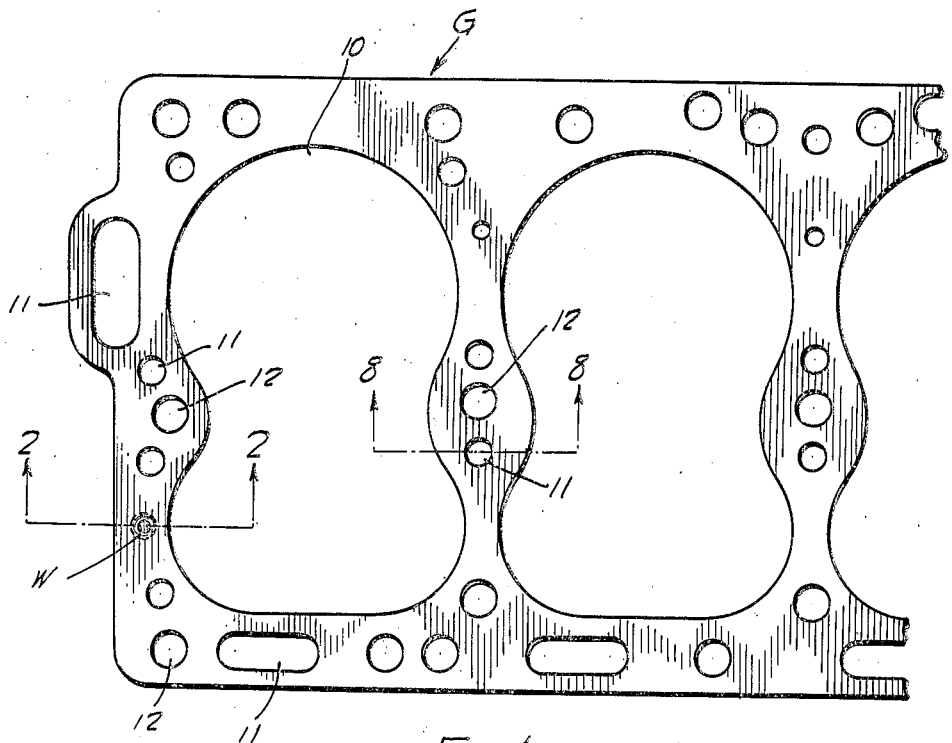

April 19, 1938.　　　M. D. FITZGERALD　　　2,114,442
GASKET
Filed Nov. 23, 1936　　　3 Sheets-Sheet 1

INVENTOR.
MARTIN D. FITZGERALD
BY Joshua R.H. Potts
ATTORNEY.

April 19, 1938.   M. D. FITZGERALD   2,114,442

GASKET

Filed Nov. 23, 1936   3 Sheets-Sheet 2

INVENTOR.
MARTIN D. FITZGERALD
BY Joshua † H. Potts
ATTORNEY.

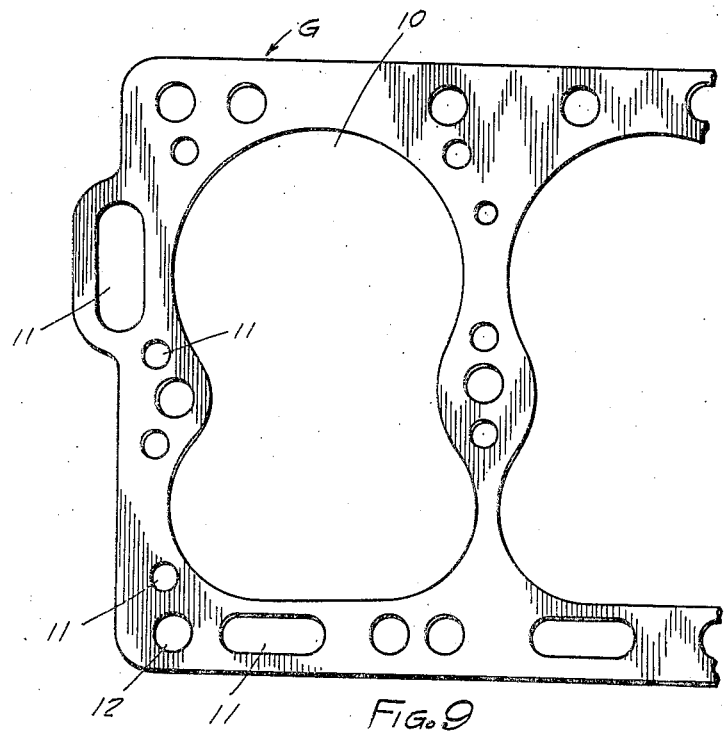
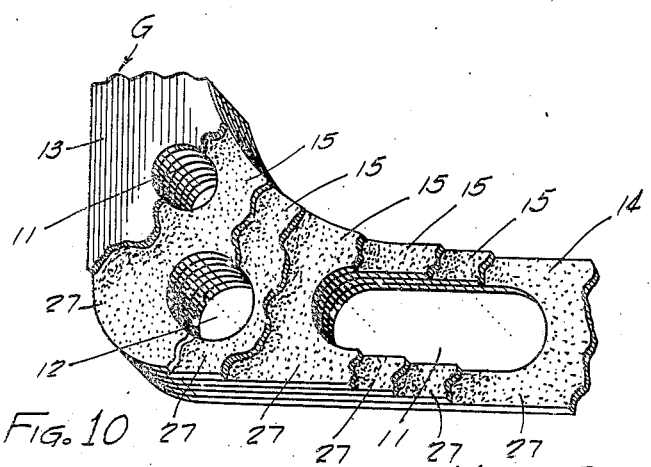

Patented Apr. 19, 1938

2,114,442

UNITED STATES PATENT OFFICE 2,114,442

GASKET

Martin D. Fitzgerald, Torrington, Conn., assignor to Fitzgerald Manufacturing Company, Torrington, Conn., a corporation of Connecticut Application November 23, 1936, Serial No. 112,273

5 Claims. (Cl. 288—1)

This invention relates to gaskets commonly known as cylinder head gaskets such as are commonly employed between an engine block of an internal combustion engine and the cylinder head therefor.

At the present time it is a substantially universal practice in this field to employ a cylinder head gasket of a laminated construction, which includes as a characteristic element a layer of asbestos, or other compressible fibrous material. Ordinarily this layer of asbestos is cased by outer layers of sheet metal.

The present invention proposes to depart from the above noted practice, and has in view as an important objective the provision of a cylinder head gasket of the character described which is of a laminated construction, and which is made up entirely of layers of sheet metal.

It is evident from the foregoing that this invention contemplates eliminating the layer of fibrous material ordinarily included by making the gasket entirely of layers of sheet metal. This arrangement presents the advantage of entirely eliminating the liability of blowing of the gasket, which is present in the type including the layer of fibrous material.

Yet another object of the present invention lies in the provision of an arrangement for maintaining the several sheet metal layers in assembled relationship. In accordance with this invention the several layers are spot welded together, and the structural design permitting of such spot welding may be carried out in any one of several ways.

A somewhat more detailed object of the invention is the provision of a laminated cylinder head gasket of the character described, comprising a plurality of sheet metal layers, and in which the intermediate layers are formed with openings, and the outer layers deformed in said openings and joined together in some preferred manner, as by welding, to maintain the several sheets in assembled relationship.

Yet another object of the present invention is the provision of a laminated cylinder head gasket of the character described, which consists of a plurality of layers of sheet metal in which certain of the sheets are cut out to provide openings, and the metal of the other layers deformed in said openings and joined together to maintain the assembled relationship of the several sheets.

Still another object is the provision of a laminated gasket of the character described in which the several metallic layers making up the gasket are held together by an adhesive.

Various other more detailed objects and advantages will in part become apparent, and in part be hereinafter stated, as the description of the invention proceeds.

The invention, therefore, comprises a cylinder head gasket of the character described which is characterized as being of a laminated construction composed entirely of layers of sheet metal. Certain of the intermediate layers of sheet metal are formed with openings, and the outer layers are deformed in the said openings and welded together to maintain the several layers in their assembled relationship.

Figure 2:
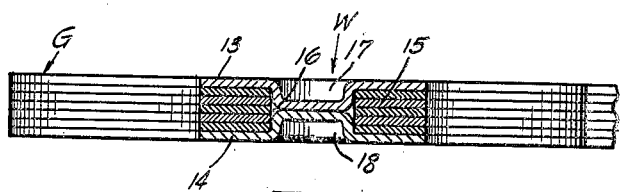
Figure 3:
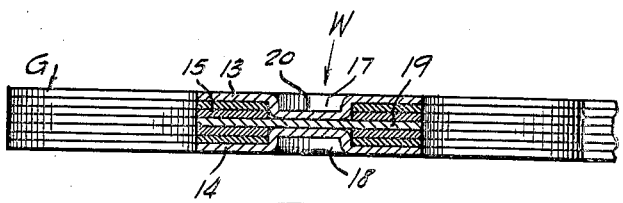
Figure 4:
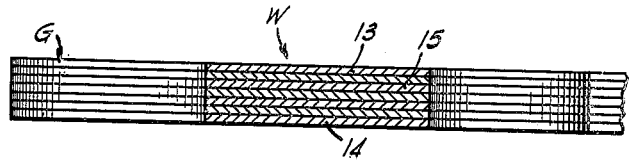
Figure 5:
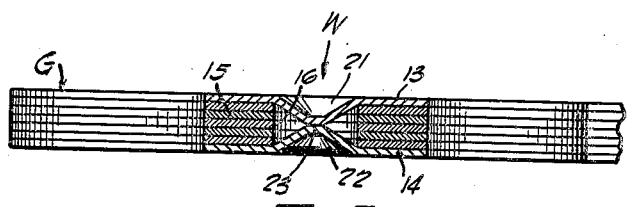
Figure 6:
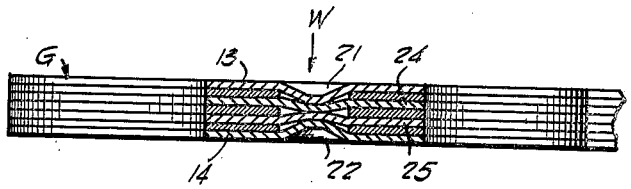
Figure 7:
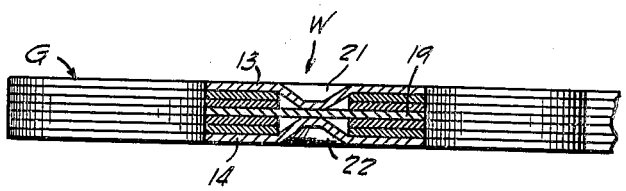

For a full and more complete understanding of the invention reference may be had to the following description and accompanying drawings, wherein Figure 1 is a top plan view of a portion of a cylinder head gasket, made in accordance with the precepts of this invention, Figure 2 is an enlarged detailed section taken about on the plane represented by the line 2—2 of Figure 1, Figure 3 is a showing similar to Figure 2 of a modification in which a somewhat different arrangement is employed for maintaining the sheets in assembled relationship, Figure 4 is still another view taken about on the plane represented by the line 2—2 of Figure 1, Likewise, Figure 5 is a view taken about on the plane represented by the line 2—2 of still another modification, Figure 6 is also taken on the plane represented by the line 2—2 of Figure 1 of another modification, Figure 7 is still another view taken on the line 2—2 of Figure 1 of another modification.

Figure 8:
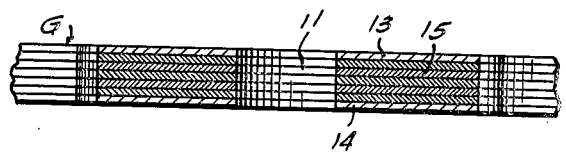

Figure 8 is an enlarged detailed vertical section taken on the plane represented by the line 8—8 of Figure 1, Figure 9 is a plan view similar to Figure 1 of a modified form, and Figure 10 is a perspective view of the form shown in Figure 9 with parts broken away.

Referring now to the drawings, wherein like reference characters denote corresponding parts, a portion of the cylinder head gasket is shown in Figure 1, and referred to generally by the reference character G. Following the usual practice the gasket G is provided with cylinder openings 10, water openings for the circulatory cooling system of the engine block represented at 11, and bolt holes 12. The openings 10, 11 and 12 are formed in the gasket G in the usual manner, so that the gasket G will conform in configuration to the top of the engine block.

Referring now more particularly to Figure 2, the gasket G is shown as comprising outer layers of sheet metal 13 and 14, which may be made from any appropriate metal, but in a preferred embodiment cold rolled steel is used for these outer sheet metal layers.

Interposed between the outer layers 13 and 14 to define the laminated structure of the gasket are a plurality of intermediate layers designated 15. The layers 15 may be made from any appropriate metal, but the invention contemplates the use of sheets of copper as the intermediate layers.

In order to maintain the outer layers 13 and 14, together with the intermediate layers 15 in assembled relationship, there is indicated at W in Figure 1 a welding arrangement for carrying out this purpose, and it is to be understood that there may be as many of these spots W disposed over the area of the gasket as found necessary. In the form of the invention shown in Figure 2 the structure W is defined by cutting away intermediate layers 15 to provide an opening in the intermediate layers, which is designated 16.

The outer layers 13 and 14 are deformed, such as by suitable metal stamping operations, into the opening 16 to provide cup-like structures 17 and 18, which are in abutting relationship. The bottoms of the cup-like structures 17 and 18, which are in engagement are joined together in some preferred manner, as by spot welding.

Referring now more particularly to Figure 3, the outer layers 13 and 14 are shown as formed with the cup-like depressions 17 and 18 in the manner shown and described in connection with Figure 2, but the bottoms of these cups 17 and 18 are not in abutting engagement in this form. In this embodiment of the invention one of the intermediate layers designated 19 is not cut away, and the bottoms of the cup-like structures 17 and 18 engage this layer 19, and are joined thereto by welding, as indicated at 20.

In the form of the invention shown in Figure 4, the intermediate layers 15 are not cut away to provide the openings 16, as in Figure 2, but the outer layers 13 and 14 are welded to the intermediate layers, as by spot welding.

Referring now more particularly to Figure 5, it will be noted that this form of the invention is closely similar to the form of the invention shown in Figure 2. The intermediate layers 15 are formed with the openings 16, and the outer layers 13 and 14 are deformed into the opening 16. However, the cup-like depressions made in the outer layers 13 and 14 assume a conical formation, as indicated at 21 and 22. The bottoms of these conical cup-like formations are in abutting engagement, and welded together, as indicated at 23.

The form of the invention illustrated in Figure 6 is similar to Figure 5, in that the metal of the outer layers 13 and 14 is deformed into the conical cup-like formations 21 and 22. However, the latter are somewhat more shallow in Figure 5, and certain of the intermediate layers, as those designated at 24 and 25 are not cut away, and the bottoms of the cup-like formations 21 and 22 engage the layers 24 and 25 and are welded thereto.

In the form of the invention shown in Figure 7, the outer metallic layers 13 and 14 are provided with conical cup-like depressions 21 and 22, which engage one of the intermediate layers 19, which is not cut away. The form of the invention shown in Figure 7 is substantially the same as that shown in Figure 3, with the exception of the change in the shape of the cup-like depressions.

Upon reference to Figure 8, a cross section of the gasket G at one of the openings 11 is readily ascertainable. It is notable that the matter of grommeting any of the openings is entirely eliminated, as this need is intimately tied up with the presence of an intermediate layer of fibrous material.

Figures 9 and 10 develop a form of the invention in which the several metallic sheets including inner sheets 15 and outer sheets 13 and 14 are held together by some suitable adhesive which is designated 27. This adhesive 27 may consist of a silica of soda, or any other appropriate cement.

While preferred specific embodiments of the invention are hereinbefore set forth, it is to be clearly understood that I am not to be limited to the exact construction illustrated and described, because various modifications of these details may be provided in putting the invention into practice within the purview of the appended claims.

I claim:

1. A cylinder head gasket of the character described comprising outer layers of sheet metal and intermediate layers of sheet metal, said intermediate layers of sheet metal being cut away to provide openings, and the metal of the outer layers being deformed into said openings to provide cup-like formations in abutting relationship, the abutting parts of said cup-like formations being welded together to maintain the several layers of the gasket in assembled relationship.

2. A cylinder head gasket of the character described comprising outer layers of sheet metal and intermediate layers of sheet metal, certain of said intermediate layers of sheet metal being formed with openings, while one of said intermediate layers of sheet metal is maintained intact along the zone corresponding with the openings formed in the other sheets, the outer layers of sheet metal being deformed into said openings to engage and join the intermediate sheet, said outer layers being joined together by their joinder to said intermediate sheet.

3. A cylinder head gasket of the character described comprising outer layers of sheet metal and intermediate layers of sheet metal interposed therebetween, alternate sheets of said intermediate layers being cut away to provide openings, while the remainder of the intermediate layers are maintained intact in the zones of said openings, said outer layers and intact inner layers being deformed into the openings in the alternate intermediate layers, and welded together whereby the outer layers are joined together by their joinder to the intermediate layers.

4. A cylinder head gasket of the character described comprising outer layers of sheet metal and intermediate layers of sheet metal, said outer and intermediate layers being formed with aligned openings corresponding to the cylinder and water openings of an engine block, said intermediate layers of sheet metal being cut away to provide openings spaced from and independent of said cylinder and water openings, and the metal of the outer layers extending over and being deformed into said openings to provide cup-like formations in abutting relationship, said cup-like formations being conical in shape and having bottoms in abutting relationship, said bottoms being spot welded together.

5. A cylinder head gasket of the character described comprising outer layers of sheet metal, and a plurality of intermediate layers of sheet metal, said outer and intermediate layers being formed with aligned openings corresponding to the cylinder and water openings of an engine block with which the gasket is to be assembled, certain of said intermediate layers of sheet metal being cut away to provide openings separate and independent from the said cylinder and water openings, while the metal of the outer layers extends over and is deformed into the space provided between openings of the intermediate layers, said outer layers being connected by a welded connection which is disposed in the space provided by said last mentioned openings.

MARTIN D. FITZGERALD.